United States Patent [19]

Lundman

[11] Patent Number: 5,170,976
[45] Date of Patent: Dec. 15, 1992

[54] TWO PIECE LOADING RAMP BRACKET

[76] Inventor: Philip L. Lundman, 3631 Fredonia-Kohler Dr., Fredonia, Wis. 53021

[21] Appl. No.: 697,267

[22] Filed: May 8, 1991

[51] Int. Cl.⁵ .......................... A47F 5/00; E01D 1/00
[52] U.S. Cl. ...................................... 248/300; 14/69.5
[58] Field of Search ......................... 14/71.1–71.3, 14/69.5; 16/5.8; 24/67, 67 R, 457; 414/537; 296/61; 248/229.6, 300, 236; 403/407.1, 59, 294

[56] References Cited

U.S. PATENT DOCUMENTS

| | | | |
|---|---|---|---|
| 798,683 | 9/1905 | Kettleman | 248/236 |
| 1,568,303 | 1/1926 | Webster | 14/69.5 |
| 2,594,425 | 4/1952 | Greenberg | 14/69.5 X |
| 3,836,106 | 9/1974 | Gray | 248/299.6 |
| 3,984,891 | 10/1976 | Weinmann | 14/69.5 |
| 4,528,711 | 7/1985 | Packer | 14/69.5 |
| 4,853,999 | 8/1989 | Smith | 14/69.5 |
| 4,949,929 | 10/1990 | Kesselman et al. | 248/300 |
| 5,035,565 | 7/1991 | White | 14/69.5 X |

Primary Examiner—Thuy M. Bui
Assistant Examiner—Nancy P. Connolly
Attorney, Agent, or Firm—Michael, Best & Friedrich

[57] ABSTRACT

A loading ramp bracket for use in attaching an upper end of a support member to an elevated support surface to facilitate use of the support member as a loading ramp for moving objects to and from the support surface, the loading ramp bracket including a first one-piece bracket member including a generally horizontal plate portion having a lower surface adapted to be positioned on the support surface and to be releaseably secured to the support surface, a downwardly inclined plate portion having a lower surface adapted to be positioned in face-to-face engagement with the upper surface of an end of the support member, the inclined portion being integrally joined to one end of the horizontal portion along a junction line, and the one piece bracket member having at least one aperture located adjacent the junction line, a second bracket member adapted to be releasably, hingedly joined to the first one-piece bracket member, the second bracket member including a lower plate portion having an upper surface adapted to be positioned in face-to-face engagement against the lower surface of the end of the support member, and a finger supported by the lower plate portion adapted to be houseably received by the aperture to releaseably, hingedly connecting the second bracket member to the first one-piece bracket member.

18 Claims, 1 Drawing Sheet

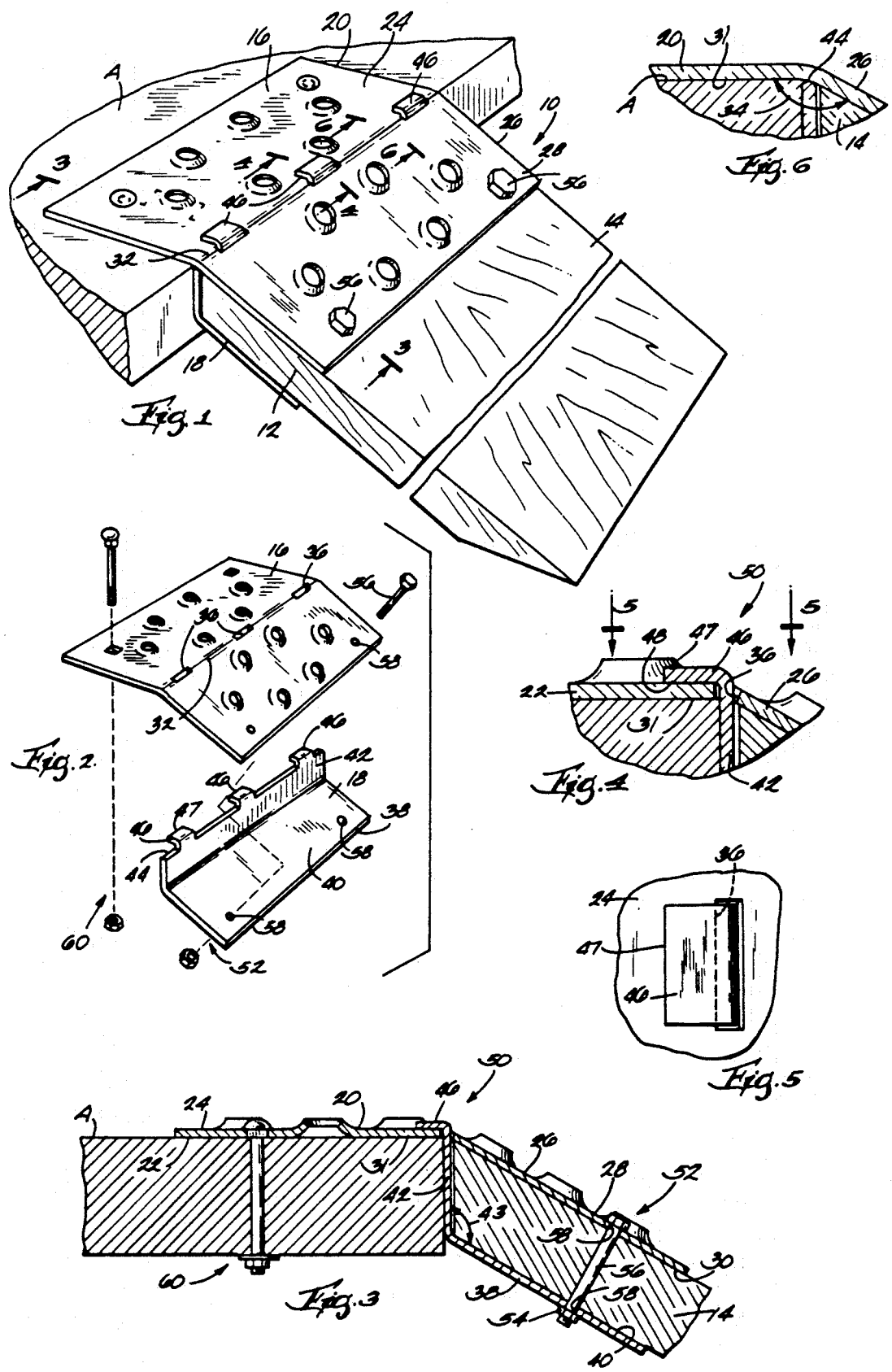

TWO PIECE LOADING RAMP BRACKET

BACKGROUND OF THE INVENTION

1. Technical Field

The invention relates generally brackets to loading ramps and brackets for attaching loading ramps to truck beds.

2. Related Prior Art

Smith U.S. Pat. No(s). 4,727,612 and 4,853,999 entitled "Tail Bridge" which issued on Mar. 1, 1988 and Aug. 8, 1989 respectively, illustrate a single-piece loading ramp bracket adapted to be fixed to the end of a plank or loading ramp and adapted to permit attachment of the loading ramp to the end of a truck bed.

SUMMARY OF THE INVENTION

One of the specific objects of the invention is to provide a loading ramp bracket which is relatively simple in design and which is relatively easy to use.

It is another object of the invention to provide a loading ramp bracket having a relatively simple construction to reduce the associated costs of manufacture.

In order to achieve these and other objects, the invention provides a loading ramp bracket for use in attaching an upper end of a support member such as a loading ramp to an elevated support surface to facilitate moving objects to and from the support surface, the loading ramp bracket comprising a first one-piece bracket member including a generally horizontal plate portion having a lower surface adapted to be positioned on the support surface and to be releaseably secured to the support surface, a downwardly inclined plate portion having a lower surface adapted to be positioned in face-to-face engagement with the upper surface of an end of the support member, the inclined portion being integrally joined to one end of the horizontal portion along a bend line, and the one piece bracket member having at least one aperture located adjacent the bend line, a second bracket member adapted to be releaseably, hingedly joined to the first one-piece bracket member, the second bracket member including a lower plate portion having an upper surface adapted to be positioned in face-to-face engagement against the lower surface of the end of the support member, and means for releaseably, hingedly connecting the second bracket member to the first one-piece bracket member, the means for hingedly connecting the first and second bracket members including a finger connected to the lower plate portion and having a free end adapted to be housed in the aperture in the first one-piece bracket member.

The invention also provides a loading ramp bracket for use in attaching an upper end of a support member to an elevated support surface to facilitate use of the support member as a loading ramp for moving objects to and from the support surface, the loading ramp bracket comprising a first one-piece bracket member including a first plate portion having a lower surface adapted to be positioned on the support surface, a second plate portion having a lower surface adapted to be positioned in face-to-face engagement with the upper surface of an end of the support member, the second plate portion being integrally joined to the first plate portion and the first and second plate portions defining therebetween an obtuse included angle, and the one-piece bracket member having therethrough at least one aperture, a second bracket member adapted to be releaseably connected to the first one-piece bracket member, the second bracket member including a lower plate portion having an upper surface adapted to be positioned in face-to-face engagement against the lower surface of the end of the support member, and means for releaseably connecting the second bracket member to the first one-piece bracket member, the means for hingedly connecting the first and second bracket members including a finger extending from the lower plate portion and having a free end adapted to be received by the aperture in the first on-piece bracket member.

The invention also provides a loading ramp bracket for use in attaching an upper end of a support member to an elevated support surface to facilitate use of the support member as a loading ramp for moving objects to and from the support surface, the loading ramp bracket comprising a first bracket member including a lower surface defined by a first plate portion having a lower surface adapted to be positioned on the support surface and a second plate portion extending from the first plate portion and having a lower surface adapted to be positioned in face-to-face engagement with the upper surface of an end of the support member, the first and second plate portions being integrally joined along a junction line, a second bracket member including a lower plate portion adapted to be placed in face-to-face engagement with the lower surface of the support member and a bent portion extending from one end of the lower plate portion and having a free edge, and means for releaseably engaging the free edge of the bent portion and the lower surface of the first bracket member adjacent the junction line.

Provision of a two-piece loading ramp bracket having separable first and second bracket members which can be releaseably connected simplifies the design and manufacture of the loading ramp bracket. Such an improvement reduces the costs of manufacture of the loading ramp bracket yet also provides a simply utilized loading ramp bracket.

Various other features and advantages of the invention will become apparent to those skilled in the art after review of the following detailed description of the preferred embodiment and claims, and the attached drawings.

BRIEF DESCRIPTION OF THE DRAWINGS
illustrated in FIG. 1.

FIG. 1 is a perspective view of a loading ramp bracket embodying the invention.

FIG. 2 is an exploded view of the loading ramp bracket illustrated in FIG. 1.

FIG. 3 is a cross-sectional view taken along line 3—3 in FIG. 1.

FIG. 4 is an enlarged view of a portion of the loading ramp bracket illustrated in FIG. 3.

FIG. 5 is a cross-sectional view taken along line 5—5 in FIG. 4.

FIG. 6 is a cross-sectional view taken along line 6—6 in FIG. 1.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIG. 1 illustrates a loading ramp bracket 10 fixed to the upper end 12 of a support member 14, such as a plank, and positioned on an elevated support surface A, such as the end of the bed of a truck, to facilitate use of the support member 14 as a loading ramp for moving objects (not shown) to and from support surface A. As shown in FIG. 2, the loading ramp bracket 10 includes a first, one-piece upper bracket member 16 and a second, lower bracket member 18 which can be releaseably connected to the first bracket member 16. When so releaseably connected, the first and second bracket members 16, 18 are adapted to be clamped into engagement with the upper end 12 of the support member 14 to be securely fastened thereto and are adapted to be securely positioned on support surface A.

More particularly (see FIG. 3), the first, one-piece bracket member 16 includes a first, generally horizontal plate portion 20 having a lower surface 22 adapted to be positioned in face-to-face engagement with support surface A and also having an upper surface 24. The first bracket member 16 also includes a second, inclined plate portion 26 extending generally downwardly from one edge of the horizontal plate portion 20 and also having an upper surface 28 and a lower surface 30. The lower surface 30 of the inclined plate portion 26 is adapted to be placed in face-to-face engagement with the upper surface of the support member 14. The respective lower surfaces 22, 30 of the horizontal plate portion 20 and the inclined plate portion 26 define the lower surface 31 of the first bracket member 16. The horizontal plate portion 20 and the inclined plate portion 26 are (FIGS. 1, 2) integrally joined along a bend or junction line 32. As shown in FIG. 6, the lower surface 22 of the horizontal plate portion 20 and the lower surface 30 of the inclined plate portion 26 preferably define therebetween an obtuse included angle 34. The first bracket member 16 also has therein (FIG. 2) a plurality of elongated apertures or slots 36 each of which are located adjacent the junction line 32 and which are elongated in the direction of the junction line 32.

Preferably, the first bracket member 16 is made of steel and may be integrally formed by welding together the first and second plate portions 20, 26, or preferably by bending a single piece of material along the bend line 32 to define the first and second plate portions 20, 26.

The second bracket member 18 includes (FIGS. 2, 3) a lower plate portion 38 having an upper surface 40 adapted to be positioned in face-to-face engagement with the lower surface of the support member 14. The second bracket member 18 also includes a bent portion 42 integrally connected with the lower plate portion 38 and extending upwardly from an edge thereof so as to define therebetween an obtuse included angle 43. The bent portion 42 has (FIG. 6) a free edge 44 which is adapted to be releaseably engaged with the lower surface 31 of the first bracket member 16 adjacent the junction line 32. The second bracket member 18 also supports (FIG. 2) a plurality of tabs or fingers 46 which have a free end 47 extending from the second bracket member 18. The fingers 46 are arranged on the second bracket 18 and are formed so as to be adapted to hingedly, releaseably housed by respective apertures 36 in the first bracket member 16. In the illustrated embodiment, the second bracket member 18 includes three fingers 46, each of which are supported along the length of the free edge 44 of the bent portion 42 and each have (FIG. 4) a lower surface 48 extending at approximately right angles to the bent portion 42. When the fingers 46 are housed by the apertures 36, the lower surfaces of the fingers 46 are engageable with the upper surface 24 of the horizontal plate portion 20.

Similar to the construction of the first bracket member 16, the second bracket member 18 is preferably made of steel and may be integrally formed by welding together the lower plate portion 38 and the bent portion 42 or preferably by bending a single piece of material to define the lower plate portion 38 and the bent portion 42.

The loading ramp bracket 10 also includes means 50 for releaseably, hingedly connecting the first bracket member 16 and the second bracket member 18. In the illustrated embodiment, the means for releaseably, hingedly connecting the first and second bracket members 16, 18 includes the apertures 36 in the first bracket member 16 and the fingers 46 supported by the second bracket member 18. In order to assemble the loading ramp bracket 10 for use, the first and second bracket members 16, 18 can be positioned so that the fingers 46 align with respective apertures 36. The first and second bracket members 16, 18 can then be engaged so that the fingers 46 are houseably received by the apertures 36. The first bracket member 16 can then be moved relative to the second bracket member 18 so that the lower surfaces 48 of the fingers 46 engage the upper surface 24 of the horizontal plate portion 20. The fingers 46 and apertures 36 cooperate so that this relative movement constitutes hinged or pivotal movement between the first and second bracket members 16, 18. When the fingers 46 and the upper surface 24 of the horizontal plate portion 20 are so engaged (FIG. 6), the free edge 44 of the bent portion 42 engages the lower surface 31 of the first bracket member 16 adjacent the junction line 32. Thus, the loading ramp bracket 10 also includes means for releaseably and selectively engaging the lower surface 31 of the first bracket member 16 and the free edge 44 of the bent portion 42.

When the first and second bracket members 16, 18 are releaseably, hingedly connected, the upper end 12 of the support member 14 can be placed between the inclined plate portion 26 of the first bracket member 16 and the lower plate portion 38 of the second bracket member 18. After being so positioned (FIGS. 1–3), the upper end 12 of the support member 14 can be clamped between the first and second bracket members 16, 18 by clamping means 52 for biasing together respective lower and upper surfaces 30, 40 o the inclined plate portion 26 and the lower plate portion 38 with the support member 14. In the illustrated embodiment, the clamping means 52 comprises a nut and bolt assembly 54 wherein the shank of a bolt 56 extends through a pair of bolt holes 58 in the inclined plate portion 26 and the lower plate portion 38 and extends through the support member 14.

Once fastened to the support member 14, the loading ramp bracket 10 can be placed on the elevated support surface A so that the lower surface 22 of the horizontal plate portion 20 is positioned in face-to-face engagement with support surface A. When so positioned, the loading ramp bracket 10 can be secured in position on support surface A by, for example, a second nut and bolt assembly 60 or similar securing means.

Various other features and advantages of the invention ar set forth in the following claims:

I claim:

1. A loading ramp bracket for use in attaching an upper end of a support member to an elevated support surface to facilitate use of the support member as a loading ramp for moving objects to and from the support surface, the loading ramp bracket comprising a first one-piece bracket member including a generally horizontal plate portion having a lower surface adapted to be positioned on the support surface and to be releaseably secured to the support surface, a downwardly inclined plate portion having a lower surface adapted to be positioned in face-to-face engagement with the upper surface of an end of the support member, the inclined portion being integrally joined to one end of the horizontal portion along a junction line, and the one-piece bracket member having at least one aperture located adjacent the junction line, a second bracket member adapted to be releaseably, hingedly joined to the first one-piece bracket member, the second bracket member including a lower plate portion having an upper surface adapted to be positioned in face-to-face engagement against the lower surface of the end of the support member, and means for releaseably, hingedly connecting the second bracket member to the first one-piece bracket member, the means for hingedly connecting the first and second bracket members including a finger connected to the lower plate portion and having a free end adapted to be housed by the aperture in the first one-piece bracket member.

2. A loading ramp bracket as set forth in claim 1 wherein the means for hingedly connecting the first and second bracket members includes means for clamping the inclined plate portion and the lower plate portion into engagement with the respective upper and lower surfaces of the support member.

3. A loading ramp bracket as set forth in claim 1 wherein the horizontal plate portion and the inclined plate portion define therebetween an obtuse included angle.

4. A loading ramp bracket as set forth in claim 1 wherein the lower plate portion includes a bent portion extending from the lower plate portion and supporting the finger, the bent portion having a free edge, and wherein the means for hingedly connecting the first and second bracket members includes means for selectively engaging the free edge of the bent portion with the first bracket member.

5. A loading ramp bracket as set forth in claim 4 wherein the free edge of the bent portion is engageable with the first bracket member adjacent the junction line.

6. A loading ramp bracket for use in attaching an upper end of a support member to an elevated support surface to facilitate use of the support member as a loading ramp for moving objects to and from the support surface, the loading ramp bracket comprising a first one-piece bracket member including a first plate portion having a lower surface adapted to be positioned on the support surface, a second plate portion having a lower surface adapted to be positioned in face-to-face engagement with the upper surface of an end of the support member, the second plate portion being integrally joined to the first plate portion and the first and second plate portions defining therebetween an obtuse included angle, and the one-piece bracket member having therethrough at least one aperture, a second bracket member adapted to be releaseably connected to the first one-piece bracket member, the second bracket member including a lower plate portion having an upper surface adapted to be positioned in face-to-face engagement against the lower surface of the end of the support member, and means for releaseably connecting the second bracket member to the first one-piece bracket member, the means for hingedly connecting the first and second bracket members including a finger extending from the lower plate portion and having a free end adapted to be received by the aperture in the first one-piece bracket member.

7. A loading ramp bracket as set forth in claim 6 wherein the first plate portion and the second plate portion are integrally joined along a junction line, and wherein the aperture is located adjacent the junction line.

8. A loading ramp bracket as set forth in claim 6 wherein the lower plate portion includes a bent portion extending from the lower plate portion, the bent portion having a free edge supporting the finger, and wherein the means for releaseably connecting the first and second bracket plates includes means for selectively engaging the free edge of the bent portion and the first bracket portion.

9. A loading ramp bracket as set forth in claim 8 wherein the first plate portion and the second plate portion are joined along a junction line, and wherein the free edge of the bent portion is engageable with the first bracket member adjacent the junction line.

10. A loading ramp bracket as set forth in claim 6 wherein the lower plate portion includes a bent portion extending from an edge of the lower plate portion and supporting the finger, and wherein the finger is angled with respect to the bent portion.

11. A loading ramp bracket as set forth in claim 10 wherein the finger and the bent portion define therebetween an obtuse included angle.

12. A loading ramp bracket as set forth in claim 10 wherein the finger is engageable with one of the first and second plate portions.

13. A loading ramp bracket as set forth in claim 6 wherein the means for selectively hingedly connecting the first and second bracket members includes means for clamping the support member between the lower plate portion and one of the first and second plate portions.

14. A loading ramp bracket for use in attaching an upper end of a support member to an elevated support surface to facilitate use of the support member as a loading ramp for moving objects to and from the support surface, the loading ramp bracket comprising a first bracket member including a lower surface defined by a first plate portion having a lower surface adapted to be positioned on the support surface and a second plate portion extending from the first plate portion and having a lower surface adapted to be positioned in face-to-face engagement with the upper surface of an end of the support member, the first and second plate portions being integrally joined along a junction line, a second bracket member including a lower plate portion adapted to be placed in face-to-face engagement with the lower surface of the support member and a bent portion extending from one end of the lower plate portion and having a free edge, and means for releaseably engaging the free edge of the bent portion and the lower surface of the first bracket member adjacent the junction line.

15. A loading ramp bracket as set forth in claim 14 wherein the means for releaseably engaging the free edge of the bent portion and the lower surface of the first bracket member includes means for selectively hingedly connecting the first bracket member and the second bracket member.

16. A loading ramp bracket as set forth in claim 15 wherein the first bracket member has therethrough an aperture, wherein the lower plate portion has a finger adapted to be received by the aperture and wherein the means for selectively hingedly connecting the free edge of the bent portion and the lower surface of the first bracket member includes the aperture and the finger.

17. A loading ramp bracket as set forth in claim 16 wherein the aperture is located adjacent the junction line.

18. A loading ramp bracket as set forth in claim 14 wherein the means for selectively engaging the free edge of the bent portion and the lower surface of the first bracket portion includes means for clamping the support member between the lower plate portion and one of the first and second plate portions.

* * * * *